Patented Sept. 30, 1941

2,257,167

UNITED STATES PATENT OFFICE 2,257,167

RENDERING OF VISCOUS TO GUMMY OLEFIN POLYMERS NONADHERENT

Philip B. Gerhardt and Julius V. Sommer, Elizabeth, N. J., assignors to Standard Oil Development Company, a corporation of Delaware No Drawing. Application June 30, 1938, Serial No. 216,854

6 Claims. (Cl. 260—94)

The present invention relates to improved methods for handling sticky, polymeric hydrocarbons, and more especially for handling high molecular weight olefin polymers.

It is known that olefins, particularly iso-olefins of 4 to 5 carbon atoms, form polymers of high molecular weights. These polymers are produced by polymerization at low temperatures with catalysts of the type of aluminum chloride, boron fluoride, zinc chloride, titanium fluoride and the like. The type of polymers changes considerably with the olefin used, the temperature of polymerization and the purity of the olefin. It is preferred to use boron fluoride for polymerization and to employ temperatures of —40° C., —60° C. or even —100° C., in order to make high molecular weight materials. The polymers are substantially saturated since they have very low iodine numbers and range in molecular weight from say 800 to 15,000 or 20,000 which are extremely viscous oils, through gummy solids ranging from say 25,000 to 80,000, and even higher molecular weight polymers which are tough and rubberlike can be made with molecular weights of 100,000 to 250,000. The molecular weights are measured by Staudinger's viscosity method.

These various materials, particularly the liquid and gummy solids, are extremely adherent and fasten tightly to almost any type of surface, metal, wood, glass, enamel, paper or other fibers, and they can be removed only with difficulty, for example, with solvents. This is at times troublesome, as will be understood, and a convenient method for rendering the surface of the polymer temporarily non-adherent or non-tacky is highly desirable.

It has been found that certain polar liquids of medium boiling range, say from 100° C. to 200° C., or 250° C., may be used for this purpose. The polymers are insoluble in such materials and they may be used to produce surface coatings for the gummy polymer to prevent adherence to packaging materials, treating rolls and other equipment in which the product is to be handled. The preferred liquids are water insoluble and of low viscosity but are themselves held tightly in a thin film on a polymer from which they evaporate only relatively slowly in air at ordinary temperatures. They are therefore extremely effective in reducing adherence of the surface of the polymer, but they can be removed quite easily by heating or by other methods and the polymer can therefore be returned to its initial highly gummy, tacky, adherent condition with greatest ease.

The preferred liquids referred to are polar substances selected from the class consisting of oxygen and nitrogen containing liquids. Of the oxygenated liquids, the alkyl esters of phthalic acid are particularly desirable, such as dimethyl, diethyl, the various propyl and butyl or amyl phthalates. All of these have been used successfully, but similar esters of mono-basic fatty acids are useful as well, particularly those esters having less than 10 carbon atoms and which are therefore sufficiently involatile so as not to be lost too readily and yet sufficiently volatile so that they can be removed if desired. It is also found that if the esters are of too high a molecular weight, i. e. containing more than about 10 carbon atoms, they tend to dissolve too readily in the olefin polymer. Esters of benzoic, salicylic, and various other acids including other di-basic acids may be used preferably when they boil within the range specified. Other materials may be employed, such as acids of the various types mentioned above or their amides, amines and ketones may also be employed, but the lower ketones such as acetone, diethyl ketone, and the like are too volatile for the purpose and heavy ketones become soluble in the polymer. Dipropyl, dibutyl, methyl-propyl, methyl-butyl, ethyl-propyl and ethyl-butyl ketones, however, are satisfactory. Aldehydes may be used but they are less satisfactory.

In applying the invention, the ester, acid, amide, amine or ketone, as the case may be, is spread over the material in which the polymer is to be wrapped, packed or treated, or if desired, liquid may be applied directly to the surface of the polymer. The adherence of the polymer is greatly reduced and the amount of the treating liquid employed may be extremely small, since only a very thin film over the surface of the polymer is required for the purpose. Of the various liquids, the esters, acids and ketones are outstandingly the best.

It will be appreciated that the adherent quality of the particular polymers may be affected by the addition of other blending agents such as waxes, asphalts, fillers, oils and the like, but such materials are very difficult to remove when once added and when used in any substantial quantities, greatly affect the primary properties of the olefin polymer and such compositions must be considered as substantially permanent. With the present treating agents, however, the great advantage is that the polymer may be temporarily rendered non-adherent, but may be returned to its original adherent state with the greatest ease and in an extremely short time without permanent impairment of its original properties.

We claim:

1. A viscous to gummy polymer of isobutylene with a surface coating of an ester of a fatty acid having less than 10 carbon atoms and boiling between about 100 to 250° C. which evaporates slowly in air at ordinary temperature.

2. A viscous to gummy polymer of an iso-olefin rendered non-adherent by the presence at the surface of the polymer of a polar organic liquid ester which is insoluble in the polymer and in water, boils between about 100 and 250° C., and evaporates slowly in air at an ordinary temperature.

3. A viscous to gummy polymer of an iso-olefin rendered non-adherent by a surface coating of an ester of phthalic acid and of a monohydric alcohol having from 1 to 5 carbon atoms.

4. Product according to claim 3, in which said ester is dimethyl phthalate.

5. The method of preventing adherence of a viscous to gummy iso-olefin polymer of high molecular weight to solid surfaces to which said polymer normally tends to adhere, which comprises applying to the surface of said polymer a thin coating film of a liquid polar organic ester which is insoluble in said polymer and in water, boils between 100 and 250° C., and evaporates slowly in air at ordinary temperatures.

6. The method of preventing adherence of a viscous to gummy iso-olefin polymer to solid surfaces to which said polymer normally tends to adhere, which comprises applying to the surface of said polymer a thin coating film of an ester of phthalic acid and of a monohydric alcohol having from 1 to 5 carbon atoms.

PHILIP B. GERHARDT.
JULIUS V. SOMMER.